United States Patent [19]
Turbessi et al.

[11] Patent Number: 5,755,140
[45] Date of Patent: May 26, 1998

[54] WINDSHIELD WIPER DRIVE ASSEMBLY

[76] Inventors: Timothy Turbessi; Jim Galloway, both of 51 Maxwell Rd., Rydol, Ga. 30171

[21] Appl. No.: 787,630

[22] Filed: Jan. 23, 1997

[51] Int. Cl.⁶ ............................. F16C 1/10; F16H 25/08
[52] U.S. Cl. ..................... 74/501.5 R; 74/53; 74/606 R; 15/250.23
[58] Field of Search ............................. 74/53, 501.5 R, 74/502.6, 606 R; 15/250.23, 250.24, 250.3

[56] References Cited

U.S. PATENT DOCUMENTS

| | | | |
|---|---|---|---|
| 4,027,354 | 6/1977 | Burpee | 15/250.3 |
| 4,529,242 | 7/1985 | Watanabe et al. | 296/78.1 |
| 4,958,405 | 9/1990 | Kuhbauch | 15/250.33 |
| 5,201,094 | 4/1993 | Yammamoto et al. | 15/250.13 |
| 5,274,876 | 1/1994 | Wehrspann | 15/250.17 |
| 5,287,585 | 2/1994 | Yamamoto et al. | 15/250.13 |
| 5,384,932 | 1/1995 | Battlogg | 15/250.23 |
| 5,408,719 | 4/1995 | DeRees et al. | 15/250.23 |

*Primary Examiner*—Vinh T. Luong
*Attorney, Agent, or Firm*—Joseph N. Breaux

[57] ABSTRACT

A windshield wiper drive assembly including an electric motor having a motor output shaft coupled to a reduction gearbox having a gearbox output shaft and a drive cam mounted onto the gearbox output shaft; a first rigid cable sheath mount connected to the reduction gearbox; a wiper mounting plate having a wiper coupling shaft rotatably mounted therethrough, a first end of the coupling shaft having a first lever arm end of a rigid lever arm rigidly connected thereto in a manner such that the lever arm extends radially from the wiper coupling shaft; a second rigid cable sheath mount connected to the mounting plate; and a push/pull cable drive mechanism including a length of cable, slidably positioned within a cable sheath having a first cable sheath end and a second cable sheath end, and a cable actuation mechanism including a roller shaft coupled to a first cable end of the cable, the roller shaft having a roller wheel positioned at the end thereof and a compression spring positioned thereover, the roller shaft being positioned with respect to the first cable sheath mount and the drive cam in a manner such that the roller is urged against the cam by a spring forced generated by the spring, a second cable end of the cable being attached to a second lever end of the lever in a manner such that movement of the roller shaft causes a corresponding movement of the lever arm.

3 Claims, 2 Drawing Sheets

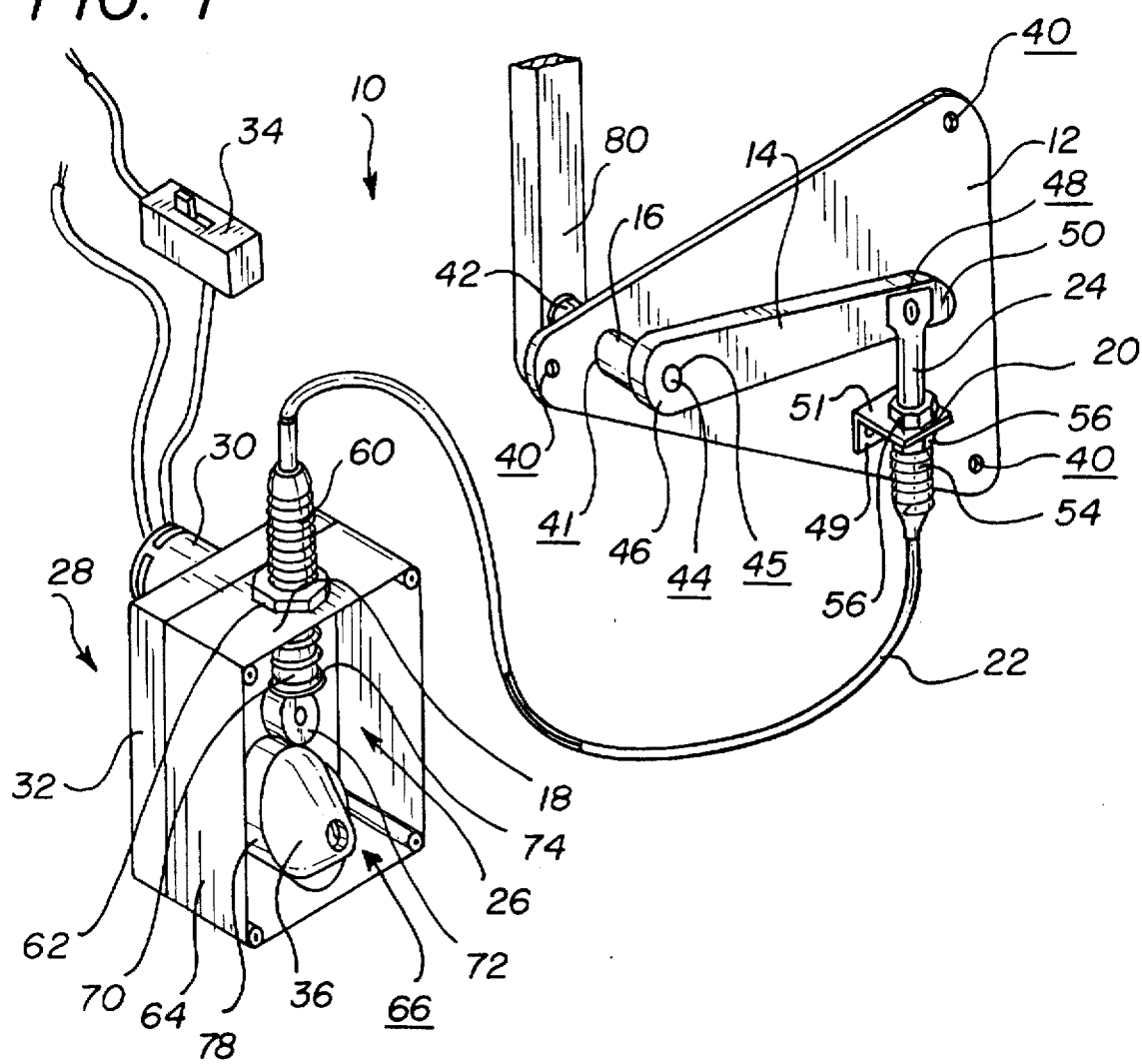
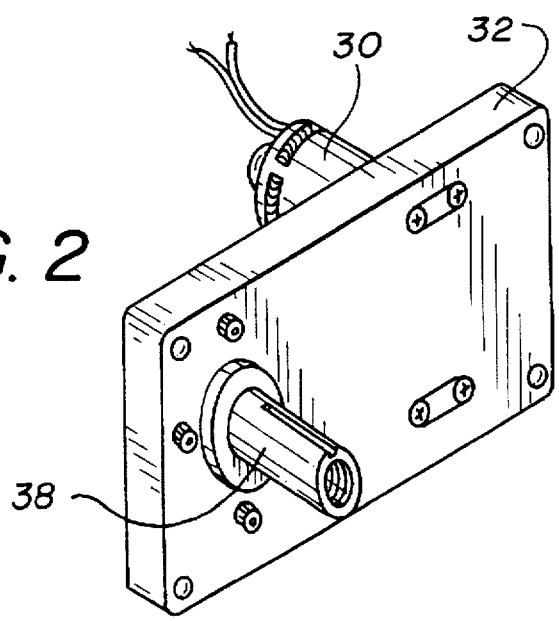

5,755,140

WINDSHIELD WIPER DRIVE ASSEMBLY

TECHNICAL FIELD

The present invention relates to drive assemblies for windshield wiper systems and more particularly to a windshield wiper drive assembly for a motorcycle windshield that includes a push/pull cable drive mechanism interconnected between a variable speed motor assembly and a wiper coupling shaft.

BACKGROUND OF THE INVENTION

The visibility through a motorcycle windshield decreases significantly when driving the motorcycle in rainy weather. It would be a benefit, therefore, to have a windshield wiper system that could wipe the windshield of rain accumulation to increase the visibility through the windshield. Although windshield wiper systems for motorcycle windshields are known, these systems can take up a significant portion of the room in the dashboard area of the motorcycle. It would be a benefit, therefore, to have a windshield wiper system that included a windshield wiper drive assembly and least a portion of which was positionable away from the dash area of the motorcycle to reduce the dash space used by the windshield wiper system.

SUMMARY OF THE INVENTION

It is thus an object of the invention to provide a windshield wiper drive assembly having at least a portion of which is positionable away from the dash area of the motorcycle.

It is a further object of the invention to provide a windshield wiper drive assembly that includes a cable drive mechanism interconnected between a drive motor and a windshield wiper.

It is a still further object of the invention to provide a windshield wiper drive assembly that includes a push/pull cable drive mechanism interconnected between a drive cam and a wiper lever arm.

It is a still further object of the invention to provide a windshield wiper drive assembly that accomplishes all of the above objects in combination.

Accordingly, a windshield wiper drive assembly is provided. The drive assembly includes a motor assembly comprising an electric motor having a motor output shaft coupled to a reduction gearbox having a gearbox output shaft and a drive cam mounted onto the gearbox output shaft; a first rigid cable sheath mount connected to the reduction gearbox; a wiper mounting plate having a wiper coupling shaft rotatably mounted through an aperture formed therethrough, a first end of the coupling shaft having a first lever arm end of a rigid lever arm rigidly connected thereto in a manner such that the lever arm extends radially from the wiper coupling shaft; a second rigid cable sheath mount connected to the mounting plate; and a push/pull cable drive mechanism including a length of cable, slidably positioned within a cable sheath having a first cable sheath end and a second cable sheath end, and a cable actuation mechanism including a roller shaft coupled to a first cable end of the cable, the roller shaft having a roller wheel positioned at the end thereof and a compression spring positioned thereover, the roller shaft being positioned with respect to the first cable sheath mount and the drive cam in a manner such that the roller is urged against the cam by a spring forced generated by the spring, a second cable end of the cable being attached to a second lever end of the lever in a manner such that movement of the roller shaft causes a corresponding movement of the lever arm. In a preferred embodiment, the motor assembly further includes a variable speed control mechanism for allowing the user to adjust the speed of the wiper movement as desired.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the windshield wiper drive assembly of the present invention showing the wiper mounting plate, the lever arm, the first and second cable sheath mounts, the cable sheath, the cable, the cable actuation mechanism and the motor assembly including the electric motor, the reduction gear box, the motor speed controller and the drive cam.

FIG. 2 is a perspective view of the motor assembly in isolation showing the electric motor, the reduction gear box and the gear box output shaft.

DESCRIPTION OF THE EXEMPLARY EMBODIMENT

Figure 3:
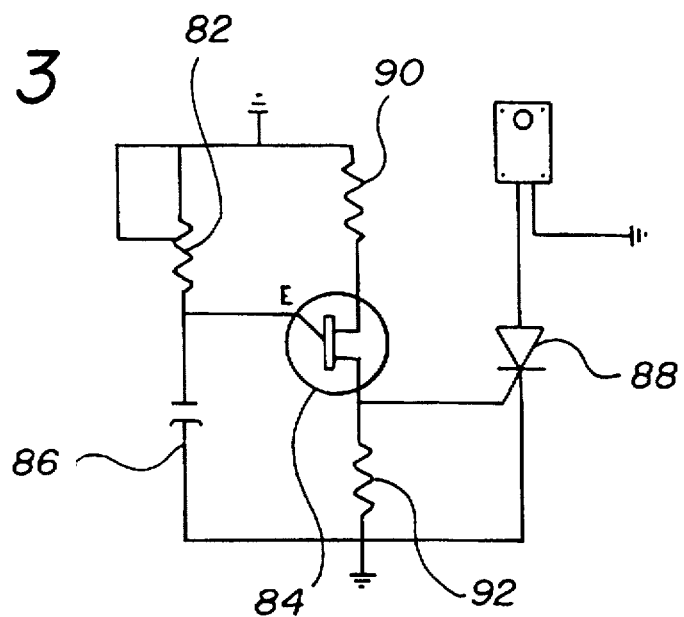
FIG. 3 is a schematic diagram of an exemplary wiper speed motor control circuit of the motor speed controller.

FIG. 1 shows an exemplary embodiment of the windshield wiper drive assembly of the present invention, generally designated by the numeral 10. Drive assembly 10 includes a wiper mounting plate 12; a lever arm 14; a wiper shaft 16; a first cable sheath mount 18; a second cable sheath mount 20; a cable sheath 22; a cable 24; a cable actuation mechanism, generally designated by the numeral 26; and a motor assembly, generally designated by the numeral 28, including an electric motor 30, a reduction gear box 32, a motor speed controller 34 and a drive cam 36. With reference to FIG. 2, electric motor 30 and reduction gear box 32 are shown in isolation. In this embodiment, electric motor 30 is a twelve volt, variable speed electric motor having its output shaft coupled to a set of conventional reduction gears provided within reduction gear box 32. Reduction gearbox has a rotating gearbox output shaft 38 upon which drive cam 36 (FIG. 1) is mounted.

Referring back to FIG. 1, in this embodiment wiper mounting plate 12 is a substantially triangular shaped section of steel plating having a mounting hole 40 provided in each of its three corners. The three mounting holes 40 are used in conjunction with conventional fastening elements, such as screws or rivets, to affix wiper mounting plate 12 to a motorcycle windshield. If desired, wiper mounting plate 12 can be contoured to correspond to the curvature of the motorcycle windshield to prevent stress buildup in the windshield glass. In this embodiment, mounting plate 12 is flat to correspond to a flat windshield.

Wiper mounting plate 12 has a shaft aperture 41 through which wiper shaft 16 is rotatably mounted in a manner such that a first wiper shaft end 42 is positioned on a windshield facing side of wiper mounting plate 12 and a second wiper shaft end 44 is positioned on a second, driver facing side of wiper mounting plate 12. Wiper shaft 16 is a length of conventional stainless steel shafting that is rotatably entrapped in shaft aperture 40.

Lever arm 16 is a section of stainless steel bar stock having a shaft mounting aperture 45 formed through a first lever end 46 and a cable mounting aperture 48 at a second lever end 50 thereof. Lever arm 16 is rigidly connected to second wiper shaft end 44 by press fitting second wiper shaft end 44 into shaft aperture 45 until a rigid connection is formed.

Second cable sheath mount 20 is an L-shaped section of steel having a first leg 49 riveted to mounting plate 12 and a second leg 51 that extends away from the surface of mounting plate 12 at a right angle and that is provided with a substantially planar surface having a sheath mounting aperture formed therethrough through which a second sheath end 54 is inserted and secured in place with a pair of securing nuts 56. A first sheath end 60 is secured to first sheath mount 18 by a pair of securing nuts 62 (only one shown) in the same manner as securing nuts 54. In this embodiment first sheath securing mount 18 is a steel box 64 that is attached along one side thereof to reduction gear box 32 and that is provided with a sheath aperture through which first sheath end 60 is inserted and secured with securing nuts 62.

Steel box 64 defines a cavity 66 for containing drive cam 36 and cable actuation mechanism 26. In this embodiment, cable actuator mechanism 26 includes a roller shaft 70 that is coupled to a first cable end of cable 24 that extends out past first sheath end 60. Roller shaft 70 is a section of conventional steel shafting that is provided with a roller wheel 72 at the far end thereof and a compression spring 74 positioned over a portion of roller shaft 70 and between roller wheel 72 and steel box 64 in a manner such that force from spring 74 biases roller wheel 72 against a contact surface 78 of drive cam 36. It can be seen from this relationship that as drive cam 36 rotates contact surface 78 forces roller wheel 72 to oscillate toward and away from first sheath end 60 causing cable 24 to move lever arm 14 in a back and forth oscillating motion. As lever arm 14 pivots back and forth, wiper shaft 16 rotates back and forth causing a wiper blade 80 attached to second shaft end 42 to move back and forth across the windshield in a conventional windshield wiper fashion.

Figure 4:
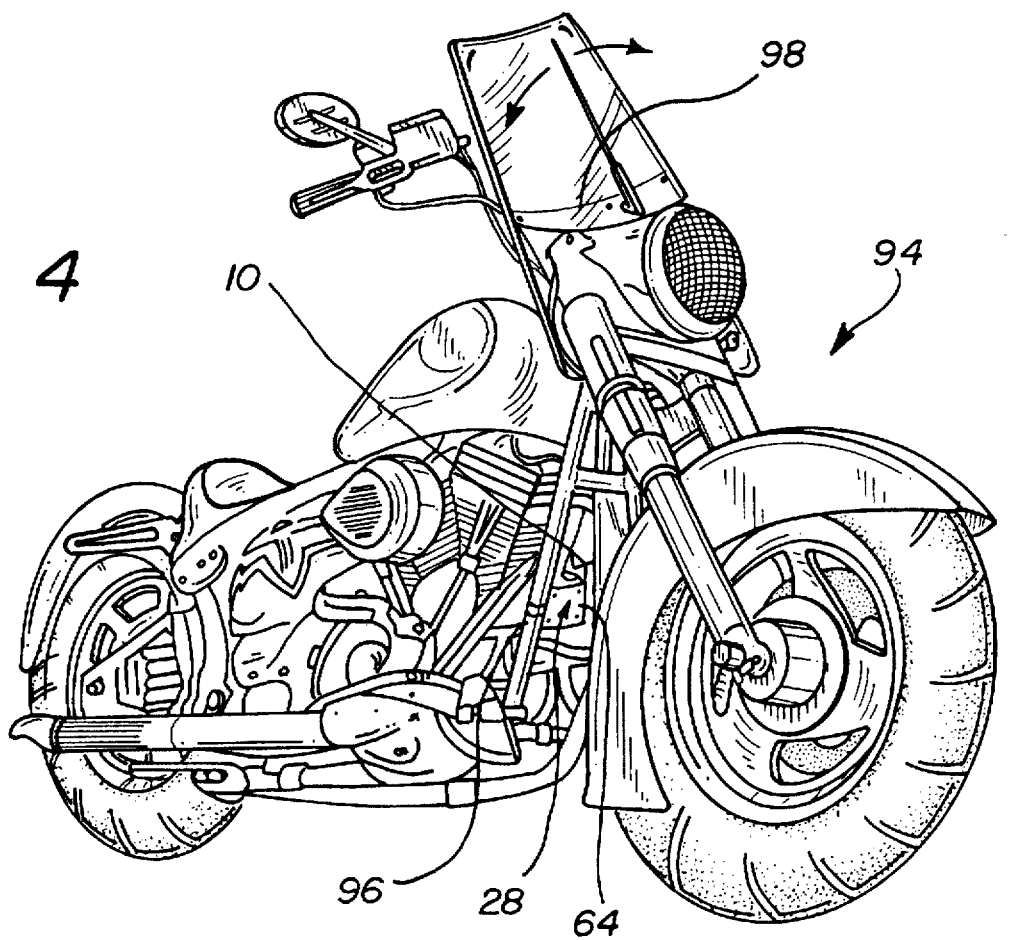
FIG. 4 is a perspective view showing the exemplary windshield wiper drive assembly of FIG. 1 installed on a representative motorcycle.

With reference to FIG. 3, variable speed control mechanism 34 is a conventional intermittent drive circuit including a variable resistor 82, a transistor 84, a capacitor 86, a silicon controlled rectifier 88, and a pair of biasing resistors 90,92. In this embodiment, variable resistor 82 is adjustable by the user to select a desired wiping frequency. FIG. 4 shows a representative motorcycle, generally designated by the numeral 94 having wiper drive assembly 10 installed. In this installation, motor assembly 28 and steel box 64 are installed to the frame 96 of motorcycle 94 away from the dash area 98.

It can be seen from the preceding description that a windshield wiper drive assembly has been provided that has at least a portion of which is oositionable away from the dash area of the motorcycle; that includes a cable drive mechanism interconnected between a drive motor and a windshield wiper; and that includes a push/pull cable drive mechanism interconnected between a drive cam and a wiper lever arm.

It is noted that the embodiment of the windshield wiper drive assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A windshield wiper drive assembly comprising:

a motor assembly comprising:

an electric motor coupled to a reduction gearbox having a gearbox output shaft and a drive cam mounted onto said gearbox output shaft;

a first rigid cable sheath mount connected to said reduction gear-box;

a wiper mounting plate having a wiper coupling shaft rotatable mounted through an aperture formed therethrough, a first end of said coupling shaft having a first lever arm end of a rigid lever arm rigidly connected thereto, said lever arm extending radially from said wiper coupling shaft;

a second rigid cable sheath mount connected to said mounting plate; and a push/pull cable drive mechanism including a length of cable, a cable sheath and a cable actuation mechanism, said cable being of a length longer than said cable sheath and slidabLy positioned through said cable sheath, said cable sheath having a first cable sheath end and a second cable sheath end, said cable actuation mechanism including a roller shaft coupled to a first cable end of said cable, said roller shaft having a roller wheel positioned at a first roller shaft end thereof and a compression spring positioned over a portion thereof, said roller shaft being positioned with respect to said first cable sheath mount and said drive cam in a manner such that said roller wheel is urged against said drive cam by a spring force generated by said spring, a second cable end of said cable being attached to a second lever end of said lever in a manner such that movement of said roller shaft causes a corresponding movement of said lever arm.

2. The windshield wiper drive assembly of claim 1, further including:

a variable speed control mechanism in controlling connection with said electric motor.

3. The windshield wiper drive assembly of claim 2, wherein:

said variable speed control mechanism is positionable at a location remote from said electric motor.

* * * * *